United States Patent [19]

Krause et al.

[11] Patent Number: 4,713,105
[45] Date of Patent: Dec. 15, 1987

[54] METHOD FOR GLASS FIBER SPLICING BY FLAME FUSION

[75] Inventors: John T. Krause, New Providence; Charles R. Kurkjian, Basking Ridge; Un-Chul Paek, Lawrenceville, all of N.J.

[73] Assignee: American Telephone and Telegraph Company, AT&T Bell Laboratories, Murray Hill, N.J.

[21] Appl. No.: 935,162

[22] Filed: Nov. 25, 1986

Related U.S. Application Data

[63] Continuation of Ser. No. 573,141, Jan. 24, 1984, abandoned.

[51] Int. Cl.$^4$ .................... C03B 23/20; C03B 37/10
[52] U.S. Cl. ........................................ 65/4.1; 65/4.2; 65/4.21; 65/36
[58] Field of Search ............ 65/4.1, 4.2, 4.21, 113, 65/120, 3.12, 36; 350/96.21, 96.15; 239/424; 219/121 P

[56] References Cited

U.S. PATENT DOCUMENTS

| | | | |
|---|---|---|---|
| 3,791,714 | 2/1974 | Maurer | 65/3.12 |
| 4,118,618 | 10/1978 | Gauthier et al. | 65/4.21 |
| 4,326,870 | 4/1982 | Bendit et al. | 65/4.21 |
| 4,345,137 | 8/1982 | Mignien et al. | 65/4.21 |
| 4,604,119 | 8/1986 | Kuhl et al. | 65/4.21 |

FOREIGN PATENT DOCUMENTS 2054553 2/1981 United Kingdom ............... 65/18.2

OTHER PUBLICATIONS

Krause et al., "Tensile Strengths Greater than 4 Gpa for Lightguide Fusion Splices", Electronics Letters, vol. 17, No. 21, 10/15/81.

Primary Examiner—S. Leon Bashore
Assistant Examiner—Michael K. Boyer
Attorney, Agent, or Firm—Peter A. Businger

[57] ABSTRACT

In the interest of producing high-strength splice connections between silica-based glass fibers a method of using a tri-particle flow of gases for flame fusion is disclosed. An outer relatively high-velocity flow of oxygen surrounds an intermediate, lower-velocity flow of chlorine or oxygen which in turn surrounds a central flow of $H_2$, $D_2$, $NH_3$, or $ND_3$.

Particularly high strengths are achieved when a central flow of hydrogen or deuterium and an intermediate flow of chlorine are used in such a fashion as to heat fiber ends to be spliced to temperatures of 500 degrees C. and beyond only after these ends have been enveloped by chlorine.

6 Claims, 1 Drawing Figure

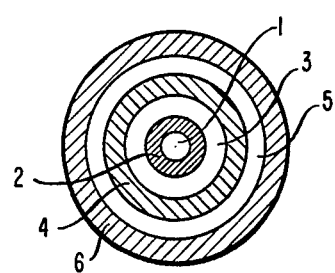

METHOD FOR GLASS FIBER SPLICING BY FLAME FUSION

This application is a continuation of application Ser. No. 573,141, filed Jan. 24, 1984, now abandoned.

CROSS-REFERENCE TO RELATED APPLICATIONS

Concurrently filed is patent application Ser. No. 573,142.

1. Field of the Invention

The invention is concerned with connecting glass fibers and, more particularly, with producing high-strength splice connections of lightguide glass fibers.

2. Background of the Invention

Lightwave communications via lightguide glass fibers is widely considered as virtually certain to replace most of current electrical communications over copper wire, and the manufacture of optical fibers has reached a high level of perfection. Fabrication aspects such as the making of preforms, the drawing of fibers, their coating and sheathing, and their interconnection are highly advanced.

Still, certain areas of manufacture are open to further improvement; e.g., it has been realized that tensile strength of a glass fiber is adversely affected by exposure to water-derived species at elevated temperatures as disclosed in U.S. patent application Ser. No. 300,108, filed Sept. 8, 1981 (now abandoned) in continuation application Ser. No. 558,995, filed Dec. 7, 1983 (now abandoned); and in continuation application Ser. No. 648,410, filed Sept. 5, 1984.

Particular attention is due, therefore, the way glass fibers are connected by splicing such as, in particular, by heat fusion splicing.

SUMMARY OF THE INVENTION

The invention is a method for splicing glass fibers by heat fusion. The method involves the use of a tri-partite flow of gases, namely, an outer, relatively high-velocity oxygen flow, an intermediate, lower-velocity chlorine or oxygen flow, and a central flow of $H_2$, $D_2$, $NH_3$ or $ND_3$. Resulting spliced fibers have a yield strength which is at least 60 percent of pristine strength.

BRIEF DESCRIPTION OF THE DRAWING

The FIGURE is a schematic cross-sectional view of a triple-orifice nozzle of a torch as may be conveniently used to practice the invention.

DETAILED DESCRIPTION

The FIGURE shows central orifice 1, intermediate orifice 3, and outer orifice 5 of a triple nozzle having coaxial cylindrical nozzles 2, 4, and 6. Each of the orifices 1, 3, and 5 can be connected to a gas supply to produce a corresponding flow out of each respective orifice. The outer diameter of the outermost nozzle 6 is typically of the order of 0.5 centimeter.

The invention is aimed at producing high-strength splice connections between glass fibers, as are being used, e.g., in optical communications. Such fibers have a surface glass portion which preferably comprises at least 95 weight percent silica, and their diameter is of the order of 100 micrometers. Optical fibers typically comprise a core portion having a refractive index which is slightly greater than the refractive index of a surrounding cladding portion; in the case of fibers for the transmission of a single optical mode the diameter of the core portion may be of the order of 10 micrometers. Raised refractive index of a core portion is conveniently achieved by doping such as, e.g., by the addition of germanium to silica.

Processing in accordance with the invention calls for bringing essentially coaxially aligned glass fibers into end-to-end contact and heating in a flame which is produced upon combustion in a flow of gases. This flow preferably comprises three portions as produced, e.g., by a nozzle as shown in the FIGURE and as may be designated outer, intermediate, and central portions. The outer flow portion preferably is at least 50 volume percent oxygen, the intermediate flow portion is preferably at least 50 volume percent chlorine, oxygen, or a mixture of chlorine and oxygen, and the central flow portion is preferably at least 50 volume percent hydrogen, ammonia, deuterium, deuterated ammonia, or a mixture thereof. (Chlorine is essentially precluded as a constituent of the intermediate flow portion when the central flow portion comprises appreciable amounts of $HN_3$ or $ND_3$.) Preferred are 90 volume percent in each of the three flow portions.

Characteristically, in accordance with the invention, velocity of flow in the outer flow portion is greater than velocity in the intermediate flow portion, preferred velocity being at least twice and preferably ten times the velocity in the intermediate flow. Such velocity differential is considered to be beneficial in that it serves to make the flame more narrow. Also, rapidly flowing outer oxygen results in desirable cooling of the fiber away from the ends of the fibers being spliced.

A splice connection is produced in accordance with the invention by heating in a flame produced upon combustion in a flow having portions as described above. The temperature of fiber ends being joined preferably does not exceed 1800 degrees C. or, more favorably, does not exceed 1700 degrees C. Temperature control is most readily achieved by regulating flow through the central orifice. Fusion time depends indirectly on fusion temperature and directly on fiber diameter; fusion times in the range of from 15 seconds to 2 minutes are typical.

Splice connections made in accordance with the invention produce a spliced fiber having a preferred tensile strength which is greater than or equal to 60 percent of pristine fiber strength (the tensile strength of fibers or the lesser of the tensile strengths of fibers being joined). Particularly high strengths of at least 95 percent of pristine strength are achieved when the inner flow is essentially hydrogen or deuterium and the intermediate flow is essentially chlorine, and if care is taken to prevent excessive heating of fiber ends prior to their being inside of the chlorine flow. This is conveniently achieved by initially keeping central hydrogen flow at a low rate so that a preferred temperature of 500 degrees C. is not exceeded until after fiber ends are within the chlorine flow. For fibers consisting essentially of fused silica (typically doped at least in part for optical purposes), resulting fiber strengths are greater than or equal to 800 kpsi.

EXAMPLE

Two essentially identical single-mode optical fibers were spliced by heat fusing in accordance with the invention. The fibers had Ge-doped cores having a diameter of approximately 10 micrometer and essentially pure silica claddings. Overall fiber diameter was 125 micrometers. The ends of the fibers were placed end-to-end and exposed to a flame produced by a torch having three concentric orifices. Essentially pure oxygen flowing at a rate of approximately 10 meters per second was fed to the outer orifice, essentially pure chlorine flowing at a rate of approximately 0.6 meters per second was fed to the intermediate orifice, and essentially pure hydrogen was fed to the central orifice. Initial hydrogen flow was adjusted just sufficient to maintain a flame and, after placing the fibers in the flame, hydrogen flow was increased for fusing. A temperature of approximately 1700 degrees C. was maintained for approximately 90 seconds, and the spliced fiber was removed from the flame. Tensile strength of the resulting combined fiber was determined to be approximately 800 kpsi.

What is claimed is:

1. Method for making a glass fiber which here is designated as a spliced fiber,
    said method comprising a step of connecting at least a first glass fiber and a second glass fiber,
    said first and said second glass fibers comprising respective surface portions which consist of at least 95 weight percent silica,
    said step of connecting comprising heating an end portion of said first fiber and an end portion of said second fiber while said end portion of said first fiber is in contact and essentially aligned with said end portion of said second fiber,
    said heating being in a flame which results upon combustion in a flow of gases,
    said flow comprising an outer flow portion, an intermediate flow portion which is interior to said outer flow portion, and central flow portion which is interior to said intermediate flow portion,
    said outer flow portion comprising at least 50 percent by volume oxygen,
    said intermediate flow portion consisting essentially of chlorine,
    said central flow portion consisting essentially of hydrogen or deuterium,
    the velocity of the flow of said outer flow portion being greater than the velocity of the flow of said intermediate flow portion so as to render said flame more narrow and so as to cool the fiber away from said end portions, and
    central flow being kept low during placement of fiber such that fiber end temperature is less than or equal to 500 degrees C. up until fiber ends are within said intermediate flow,
    whereby said spliced fiber has a tensile strength which is at least 95 percent of pristine strength.

2. Method of claim 1 in which the velocity of the flow of said outer flow portion is at least twice the velocity of the flow of said intermediate flow portion.

3. Method of claim 1 in which a flow rate is achieved in said outer flow portion which is greater than or equal to 5 meters per second.

4. Method of claim 1 in which a flow rate is achieved in said intermediate flow portion which is greater than or equal to 0.1 meters per second.

5. Method of claim 4 in which a flow rate is achieved in said intermediate flow portion which is less than or equal to 1 meter per second.

6. Method of claim 1 in which flow rate in said central flow portion is adjusted such that the temperature of said first end portion and said second end portion is less than or equal to 1800 degrees C.

* * * * *

UNITED STATES PATENT AND TRADEMARK OFFICE
CERTIFICATE OF CORRECTION

PATENT NO. : 4,713,105

DATED : December 15, 1987

INVENTOR(S) : John T. Krause, Charles R. Kurkjian, and Un-Chul Paek

It is certified that error appears in the above-identified patent and that said Letters Patent is hereby corrected as shown below:

In the Abstract, line 3, "tri-particle" should read --tri-partite--.

Signed and Sealed this

Twelfth Day of July, 1988

*Attest:*

*Attesting Officer*

DONALD J. QUIGG

*Commissioner of Patents and Trademarks*